C. WINTERGERST,
Assignor to DOANE & WELLINGTON.
Vapor-Burner.
No. 8,784. Reissued July 1, 1879.
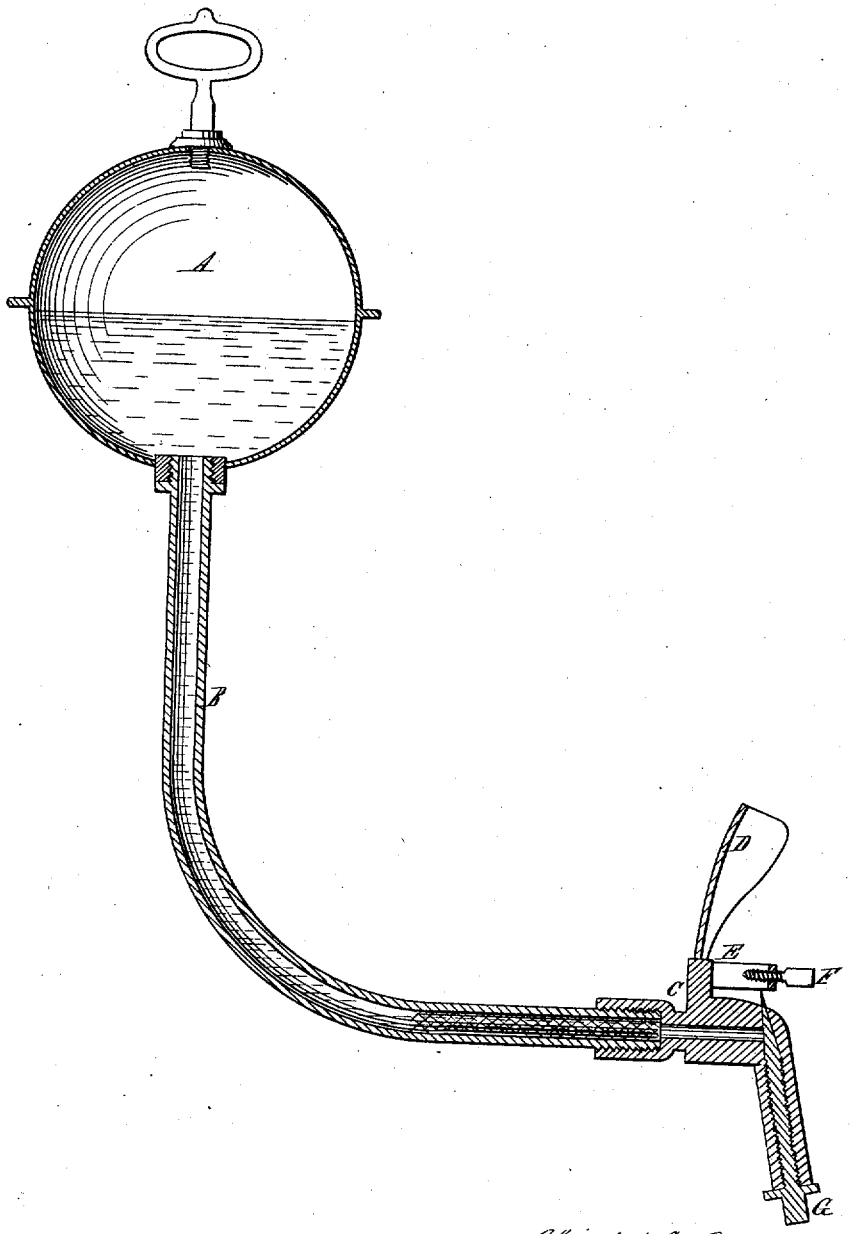
Attest:
Chas. F. Searle
O. J. Morgan
Christoph Wintergerst,
Inventor.
By Worth Osgood,
Attorney.
N. PETERS. PHOTO-LITHOGRAPHER, WASHINGTON, D. C.

UNITED STATES PATENT OFFICE

CHRISTOPH WINTERGERST, OF MOBILE, ALABAMA, ASSIGNOR TO DOANE & WELLINGTON, OF NEW YORK CITY.

IMPROVEMENT IN VAPOR-BURNERS.

Specification forming part of Letters Patent No. 82,262, dated September 15, 1868; Reissue No. 8,784, dated July 1, 1879; application filed April 30, 1879.

*To all whom it may concern:*

Be it known that I, CHRISTOPH WINTERGERST, of Mobile, in the county of Mobile and State of Alabama, have invented certain new and useful Improvements in Vapor-Burners, of which the following is a full, clear, and exact description, reference being had to the accompanying drawing, and to the letters of reference marked thereon.

My invention has relation to that class of burners wherein the gas for burning is produced by the vaporization of light hydrocarbons, such as the petroleum products, at or near the point of combustion, the purpose or object of my improvements being the production of a burner capable of producing a clear strong flame, economical in the consumption of the gas-generating fluid, affording an easy means of regulating the flow of the vapor or gas, and preventing the clogging up of the gas-jet orifice, and one obviating any danger of explosion.

To accomplish all of this the invention consists, essentially, in combining with the burner a plate, against which the issuing gas is made to impinge as it flows from an orifice controlled by a needle-valve; in combining with a burner having such flame-plate and needle-valve a protector calculated to direct and steady the flow of fresh air which is to be mingled with the gas before burning; and in certain peculiarities of construction and new and useful arrangements or combinations of parts, all of which will be hereinafter first fully described, and then pointed out in the claims.

To enable others skilled in the art to make and use my invention, I will now proceed to describe its construction and operation, referring to the accompanying drawing, and to the letters of reference marked thereon, which drawing forms a part of this specification, and represents a vertical sectional view of my improved burner connected with an oil-fount.

A represents the reservoir for the oil, which passes through the tube B into the vaporizing-chamber of burner C. The lower end of tube B is shown as packed with lamp-wicking, useful to prevent the oil from passing through too quickly, and to insure a steady flow thereof.

Within the channel of the burner which communicates with pipe B the vaporization of the oil takes place in consequence of the heat communicated from the burning gas or vapor to the walls of said channel; and the gas so generated finds an exit at a small orifice controlled by the needle-pointed valve G. From this orifice the gas is directed against the flame-plate D, which not only serves to spread the flame, but to communicate the requisite heat to the vaporizing-chamber.

The screw-valve G controls the gas-jet orifice, so that the amount of gas to be consumed can be carefully regulated; and since the point of this valve projects through the orifice, it also serves to keep it free and clear of obstruction without the necessity of separate picking with a detached instrument, as heretofore practiced in connection with very many styles of vapor-burners.

The admixture of some air with the gas is practically essential, in order to secure economical results; and it is desirable that the current of air induced by the flowing gas-jet should be uniform, and be directed properly toward the gas-current, so as to insure a thorough commingling of the two, and obviate the objectionable flickering and unsteadiness of the flame. To provide for this I mount a ring, E, upon the burner, said ring opening at both ends, and affording a channel through which the gas-jet is directed before being allowed to impinge against plate D. This device E serves to direct the mingled air and gas upon the plate, and it prevents currents of air from disturbing the continued uniform flow of the burning mixture by confining the air-currents to certain directions.

The thumb-screw F is useful to divide the current of mingled air and gas and cause it to spread evenly over the plate D. The flame from this burner resembles that of an ordinary gas-light, and compares favorably with it in point of brilliancy, steadiness, and economy.

The pressure of the fluid within reservoir A is such as to cause the flow of gas with sufficient force to insure a burning at or very near the upper edge of plate D, and the illuminating-flame projects beyond this edge.

To start the flow of gas the burner has, of course, to be first heated by any suitable means, after which the heat from the illuminating-flame is sufficient to maintain the required vaporization.

Having now fully described my invention, what I claim as new, and desire to secure by Letters Patent, is—

1. In a vapor-burner of the character herein specified, the combination, with the vaporizing-chamber, of a projecting plate connected therewith, and adapted to receive the current of combined air and gas to spread the same, and to conduct heat to the vaporizing-chamber, and a needle-valve projecting through the gas-jet orifice, by which valve the flow of illuminating-gas may be regulated, substantially as and for the purposes set forth.

2. In a vapor-burner of the character herein specified, the combination of the vaporizing-chamber, the spreading and heat-conducting plate connected therewith, a needle-valve mounted thereon, and a gas-jet orifice located therein, the whole being adapted to regulate and control the quantity and direction of the flow of illuminating-gas, substantially as shown and described.

3. In a vapor-burner provided with a vaporizing-chamber and a needle-valve adapted to regulate the flow of illuminating-gas from said chamber and to clear the gas-jet orifice, the combination, with the said valved orifice and chamber, of a spreading and heat-conducting plate, located and arranged substantially as shown, so as to receive gas from the one and conduct heat to the other, for the purpose of maintaining a steady illuminating-flame, substantially as set forth.

4. In a vapor-burner of the character herein specified, the combination of the vaporizing-chamber, the spreading and heat-conducting plate connected therewith, a gas-jet orifice leading from said vaporizing-chamber and controlled by a needle-valve, and an air and gas director located upon the burner, substantially as and for the purpose set forth.

5. In a vapor-burner of the character herein specified, the combination of the vaporizing-chamber, the spreading and heat-conducting plate connected therewith, a gas-jet orifice leading from said vaporizing-chamber, and an air and gas director located upon the plate, substantially as and for the purposes set forth.

6. In a vapor-burner of the character herein specified, the combination of the vaporizing-chamber, the spreading and heat-conducting plate connected therewith, a gas-jet orifice controlled by a needle-valve, and an air and gas director located upon the burner, and a spreading-screw connected with the director, substantially as and for the purposes set forth.

7. The combination, with burner C, provided with the vaporizing-chamber, of plate D, needle-valve G, controlling the gas-jet orifice, and director E, substantially as shown and described.

8. The combination of burner C, plate D, needle-valve G, controlling the gas-jet orifice, director E, and screw F, substantially as shown and described.

In testimony that I claim the foregoing I have hereunto set my hand in the presence of two witnesses.

CHRISTOPH WINTERGERST. [L. S.]

Witnesses:

JOHN A. TARDY,

WM. H. SMITH.